April 7, 1970 P. E. SCHMIDT 3,505,435

METHOD OF MANUFACTURING A PARTIALLY FOAMED, FOAMABLE THERMOPLASTIC CONTAINER

Filed Sept. 30, 1966

INVENTOR.
Paul E. Schmidt 3,505,435

METHOD OF MANUFACTURING A PARTIALLY FOAMED, FOAMABLE THERMOPLASTIC CONTAINER

Paul E. Schmidt, Olympia Fields, Ill., assignor to Standard Oil Company, Chicago, Ill., a corporation of Indiana Filed Sept. 30, 1966, Ser. No. 583,488
Int. Cl. B29d 23/02, 27/00
U.S. Cl. 264—41 3 Claims

ABSTRACT OF THE DISCLOSURE

A method and apparatus for producing a partially foamed, foamable thermoplastic article and particularly a container. The method involves injection molding of a foamable preform and heating selected portions of the preform to form a, partially foamed, foamable article. A cooling step to prevent further foaming follows the heating step. The apparatus includes a porous male portion adapted to heat the preform and a jacketed female portion adapted to cool the preform.

Figure 1:
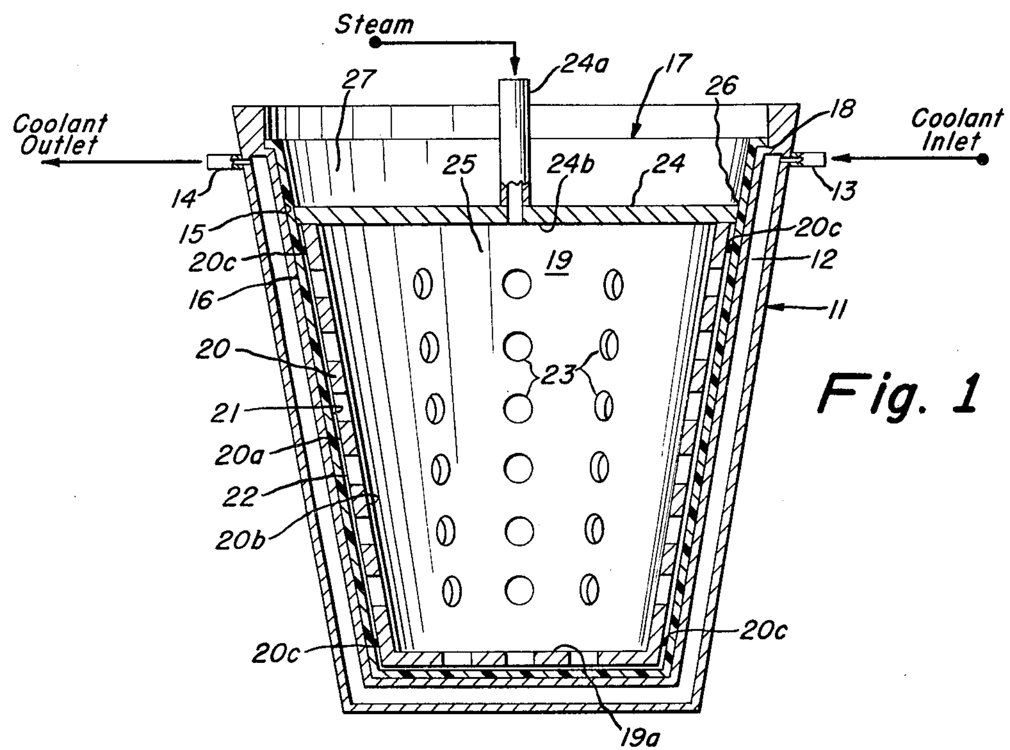

This invention relates to a method of manufacturing foamable articles. The invention particularly concerns molded foamable thermoplastic articles of manufacture which may be shaped by molding and subsequently foamed at the point of end use or after the article is in place.

By way of illustration and without limitation this invention can be utilized in the manufacture of container articles such as cups and the like. Similarly, this invention can be utilized in the manufacture of articles for insulation, structural members, decorative pieces, and in a myriad of other applications. The flexibility and functionality of the subject matter of this invention reside in the many capabilities, such as the forming as by molding of practically any size parts, members, articles, etc., setting them in place in their structural or functional environment and subsequently commencing and controlling the foaming of the molded work-piece. Consequently, the molded foamable article can be shaped, placed in a position inaccessable or non-accommodating to a foamed piece in the first instance and after placement foaming can be commenced and controlled. Additionally, within the purview of this invention, a work-piece can be formed an embellished with attractive designs.

For example, a great need has long existed for a new and useful container article and its method of manufacture wherein cups and like containers can be produced quickly, easily, and inexpensively for a myriad of uses, including use in the coin-operated vending industry. Cups and like containers presently produced for the vending machine market have many disadvantages which the present invention obviates.

Heretofore, many of the existing articles of manufacture have been produced by molding cups and other containers from foamable polystyrene beads in a stream process wherein the container is removed from the mold in its finally foamed from. Such production methods have disadvantages residing in a long cycle time in the molding of the container because the insulating nature of the foam inhibits heat transfer and, consequently, requires an extended cooling period in the mold. Furthermore, in the production of the foamed containers there exists an inherent inability to produce an article having accurately controlled exterior and interior dimensions which prevent favorable handling, packaging and dispensing of the articles. Additionally, the foamed container has a large and cumbersome wall thickness which greatly reduces the number of containers which can be stacked and stored in a given volume as in warehousing or in a vending machine.

Additional disadvantages reside in the lack of exterior smoothness which increases frictional forces between surfaces of stacked containers, and the open cellular foam structure of the upper rim on drinking containers has a blotter-like effect that tends to adhere to the lips and remove moisture and lipstick upon contact during drinking. Furthermore, if the article is fully foamed in the mold, it cannot be further foamed at a later time to embellish the piece with an attractive design or to improve its insulation properties or structural characteristics, such as size, strength, etc.

Methods and apparatus in the art are exemplified by Edwards, U.S. Patent No. 3,141,595; Suh, U.S. Patent No. 3,159,698; and Lafferty, U.S. Patent No. 3,042,972. The Edwards and Suh patents concern the extrusion of a foam, the lamination of said foam to a solid sheet, and the subsequent forming of the laminate. The Lafferty patent suggests extrusion similar to Edwards and Suh; however, no laminate is used, but the extruded sheet is quenched to prevent appreciable foaming until a later heating step. None of the art anticipates nor even suggests the novel article and the method for producing the subject matter of this application.

It is a primary object of this invention to provide a new and useful method for producing a foamable thermoplastic article of manufacture which can be foamed subsequent to molding, such as at the point of end use.

Another object of the invention is to provide a novel method for producing a foamable thermoplastic article of manufacture wherein the article may be embellished with attractive design during the molding or subsequent thereto.

An additional object of this invention is to provide a novel method for producing a molded foamable plastic article wherein the cycle time per unit production is substantially reduced.

Another object of this invention is to provide a novel method for thep roduction of a plastic container article having accurately controlled interior and exterior dimensions and smooth exterior surfaces.

Another object of this invention is to produce a molded foamable plastic container having a substantially reduced wall thickness which significantly decreases storage space requirements.

Another object of this invention is to manufacture a molded foamable plastic container which when used as a drinking cup has a smooth, non-porous upper rim with accurate dimensions and a clear smooth exterior wall surface susceptible to embellishment with attractive designs.

It has been discovered that when a foamable thermoplastic material is injection molded into a closed mold under pressure sufficient to prevent foaming agent activity, a novel article of manufacture can be produced. When the article is subsequently placed into its environment for end use, heat can be applied to commence the foaming of the article for a time sufficient to attain the desired degree of foaming. The article may also be selectively foamed in a manner to embellish it with attractive designs.

In another embodiment of this invention, an article such as a cup or container may be molded from a foamable thermoplastic material under sufficient pressure to prevent foaming. The rigid non-foamed molded article can then be placed in a rigid, accurately-fitted cold-walled cavity and a cover having a port can be placed interiorly and recessed below the upper rim of the article so that heat through the port may be subjected to the interior surfaces of the container-like article to initially foam the surfaces for a time sufficient to merely commence the foaming activity. When the partially foamed article is removed from the cavity, the outer surface and upper lip remain smooth, hard and unfoamed while the inner partially foamed surfaces have a small amount of uniformly distributed frosty-appearing foam formations. The partially foamed container-like article, having a substantially thin-walled construction, can then be packaged, transported and stored in substantially less space and at much less expense than the fully foamed work-piece. At the point of end use, such as when the container is filled with the heated fluid, the foaming is completed by the heat of the contents and the container is structurally strengthened and improved insulation properties are introduced which maintain the heat in the contents for a substantially greater length of time.

In another embodiment of this invention, a plug having accurately shaped apertured surfaces may be inserted in the container article within said cavity followed by the insertion of the cover which is recessed below the upper circumferential rim of the article so that the cover rests on the upper periphery of said plug to serve as a top for the plug and a closure means or barrier between the exposed portion of said container on one side of the cover and the unexposed portion of the container on the other side of the cover.

Figure 2:
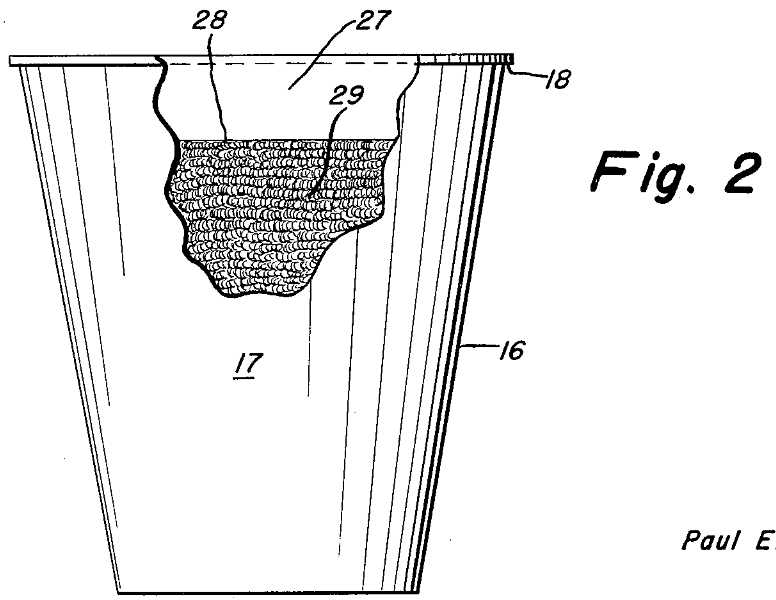

The accompanying drawings merely illustrate embodiments of this invention, and it is understood that the specific details may vary widely without departing from the basic principles wherein:

FIG. 1 is an elevation view in cross section of the rigid cold-walled cavity containing a cup holding the apertured plug inserted therein and having a top recessed within the cup; and FIG. 2 is a partially broken elevation view of a plastic cup portraying a smooth exterior surface, a smooth interior rim portion, and a foamed interior.

Referring to FIG. 1, rigid cavity 11 has a hollow interior 12 communicating with inlet 13 and outlet 14. Cavity 11 has a smooth interior surface 15 accurately fitted to accommodate the exterior surface 16 of molded plastic cup 17.

The upper portion of cavity 11 is shaped to accept the overhanging or rolled lip 18 of cup 17. Apertured hollow plug 19 is machined to fit into cup 17 so that there is provided between the plug sidewall 20 and the interior surface 21 of cup 17 a uniform spacing or chamber 22. Plug 19 is equipped with apertures 23 which extend through the thickness of the plug sidewall 20 and bottom between surfaces **20*a* and 20*b* to communicate with the uniform spacing 22 between the exterior surface 20*a* of said plug and the interior surface 21 of the cup. Plug 19 is equipped at its upper portion with a top 24 having inlet 24*a* communicating with the hollow interior 25. Top 24 is constructed to tightly fit over plug 19 and to make contact at its periphery 26 with the interior wall surface 21 of cup 17 to close the spacing 22 between plug 19 and cup 17 to form chamber communicating through apertures 23 with plug interior 25 and inlet 24. Obviously, top 24 can be an integral part of plug 19. Plug cover 24 is inserted in cup 17 below the rolled lip 18 of cup 17 to allow the exposure of interior rim 27**.

FIG. 2 is a partially broken elevation view of the plastic cup 17 which has a smooth exterior surface 16, a rolled or overhanging lip 18 and a smooth interior rim 27. The foam line 28 is the line formed by the periphery 26 of the lower surface **24*b* of top 24 which extends beyond the exterior surface 20*a* of plug 19. The extended interior periphery 26 of surface 24*b* of top 24 acts as a seal to form chamber 22 between exterior plug surface 20*a* and interior cup surface 21. Foam surface 29 is formed within chamber 22, and the additional wall thickness of cup 17 as a result of foam 29, is approximately equal to the distance across chamber 22 between surfaces 20*a* and 21. The entire inner wall and bottom surfaces of cup 17 below foam line 28 is covered by foam 29**.

In operation, any foamable thermoplastic material such as foamable polystyrene beads, foamable polyethylene, foamable polyvinyl chloride, etc., can be injection-molded in any conventional plastic injection molding machine for forming an article of manufacture. The foaming agent may be any of the well-known ones and it may be injected concurrently with the thermoplastic material or it may be premixed with the thermoplastic material before injection molding. The foamable thermoplastic material is injected into the mold under sufficient pressure to prevent foaming agent activity within the mold. The article thus formed is non-foamed, smooth-surfaced, and is also transparent when produced from polystyrene or polyvinyl chloride. The plastic article is formed simply and quickly and with the reduced cycle time provided by the production of non-foamed work-pieces and the cooling time is substantially less than that required for foamed articles.

When the article thus formed is removed from the injection mold, it can subsequently be placed in the desired environment, such as that requiring structural members or insulators. After inserting the article in its final position, the work-piece can be finally foamed to the degree required through the application of heat over the necessary time interval. The application of heat can be by any method such as directing steam or other heated fluid over the area of the article to be foamed. The heat source is not restricted to a particular type of heat since dry heat from any radiating source may also be used. Similarly, should it be desired to embellish the molded foamable thermoplastic article with attractive designs, such may be carried out before or after placement of the work-piece in its environmental position by the selective application of heat for foaming the article to form such design by the contrasting appearances and structure formed by adjacent foamed and non-foamed areas.

For example, by way of mere illustration, without limitation of the invention herein defined, when the container article thus formed as above is removed from the injection mold, it can be placed within the accurately fitted cold-walled cavity 11 in a manner so that all exterior surfaces 21 of cup 17 rest firmly against the interior surface 15 of cavity 11 to prevent foaming of the exterior surfaces of said cup in order to retain the smooth vitreous exterior that provides improved handling, economy in storage and transporation, accuracy in mechanical dispensing and ease of decoration. In the operation of the preferred embodiment of this invention the cover or top 24 is placed within the plastic container article 17 so that the periphery 26 of said top rests against the interior wall 21 of the article. No hollow apertured plug 19 is inserted. Steam or other heated fluid is introduced through inlet 24 into the interior of the article at a pressure and for a time sufficient to commence foaming agent activity on the inner walls of the container article. The time and temperature conditions under which the steam or other fluid is brought into contact with the surface being foamed is determined specifically for each particular type of foamable plastic material out of which the work-piece is made. The foaming, however, need to be only sufficient to cause the interior wall of the foamable article to have a frosty appearance when cover 24 is withdrawn from its recessed position in the container 17 and the container is removed from the cavity. The article retains a thin wall and has an unusually favorable appearance. The work-piece may be stacked, packaged, stored and dispensed in a manner superior to other foamed containers because the walls are thin, the exterior surfaces are smooth and hard, and the upper peripheral rim is accurately formed and retains its shape.

When plug 19 is an embodiment of this invention, a cup 17 is placed within cavity 11, and plug 19 is then placed into cup 17 in a manner so that it rests as shown in FIG. 1 so that chamber 22 is formed between the exterior surface **20*a* of plug 20 and the interior surface 21 of cup 17. The chamber 22 or spacing thus formed provides a predetermined volume for the foaming of the interior surfaces of cup 17 and when the foam 29 shown in FIG. 2 has substantially filled the volume defined by chamber 22**, foaming ceases.

Cover 24 having steam inlet 24*a* and extended periphery 26 is recessed into the cup and fitted firmly over the top portion of plug 19 and against the interior surface 21 of cup 17. A cooled heat exchange medium having a temperature below about 120° F. is circulated through inlet 13 into the hollow interior 12 of cavity 11 and out through outlet 14 to provide a cool exterior surface 16*a* on cup 17 to prevent foaming of the exterior surface. Steam under pressure can be introduced from a source not shown through cover inlet 24*a* into the plug interior 25 where the steam moves through communicating apertures 23 into chamber 22 to cause foamable thermoplastic interior surface 21 of cup 17 to commence foaming agent activity to produce the frosty appearance of the initially foamed surface 29 shown in FIG. 2. The apertures 23 should be sufficiently small in diameter so that during foaming no material will expand into the apertures. When the foaming surface substantially expands to fill the volume defined by chamber 22, cooling occurs when steam is withdrawn from plug interior 25. Cover 24 is removed and the article is withdrawn from cavity 11. The container has an attractive appearance, being generally crystal clear when polystyrene of polyvinyl chloride is used. The outer surface is hard and smooth and the interior surface 21 has a slightly frosty appearance due to the initial partial foaming thereof. The smooth outer surface 16 of the article is pleasing to the touch and can easily be decorated if desired. Conversely, should it be desirable to foam the outside such could be done without departing from the spirit of this invention.

The volume of chamber 22 has been predetermined so that foaming agent activity in the plastic container has not been brought to completion when chamber 22 is substantially foam filled. Consequently, when cover 24, plug 19 and cup 17 are removed from cavity 11, the cup may be filled with a hot fluid such as coffee or other heated materials and the unexpended foaming agent will again commence activity and produce a further foaming of the surface within the cup or container to provide additional insulation properties which substantially reduce the rate of heat transfer and allow the heated contents to retain heat for a significantly longer period. The second foaming commenced by the introduction of a heated material into the container produces a thicker-walled article; therefore, it is desirable that the thin wall of the container be maintained for better handling purposes, such as storage, transportation, and vending until the heated material is introduced at the point of end use.

In the process of injection molding molten thermoplastic material containing a foaming agent along with gases such as air, and moisture, it is not understood why the air and moisture may be ejected through the parting lines and knockout pins of the mold assembly, yet sufficient amounts of the foaming agent are retained to produce the initial and final foaming of the article. When the container is initially foamed a small amount so that the inner surface of the plastic article has a frosty appearance, and when hot coffee or other heated liquids are introduced the cup is fully foamed and surprisingly, the container is given superior strength and it does not lose its shape through softening as in the case where no initial foaming has taken place.

The following example tends to illustrate the practice of my invention; however, it is not intended to limit the method and apparatus disclosed herein in any way.

EXAMPLE

A commercially available expandable polystyrene bead material was used in a Moslo-molding machine to form a four-ounce cup. The mold has replaceable cores so that cups with either 0.060 inch or 0.015 inch wall thicknesses could be made. The molding machine operated under the following cycle conditions shown below in table.

TABLE

| | 0.060 wall | 0.015 wall |
|---|---|---|
| Cylinder temp., ° F.: | | |
| Front | 450 | 600 |
| Rear | 475 | 600 |
| Nozzle Temp., ° F. | 435 | 500 |
| Mold temp., ° F.: | | |
| Front | 150 | 170 |
| Rear | 100 | 140 |
| Inj. press., p.s.i. | 16,000 | 16,000 |
| Cycle time, sec.: | | |
| Overall | 25 | 30 |
| Injection | 4 | 5 |
| Booster | 1 | 2 |

The plastic cups formed in the above manner and under the conditions shown were subjected to heat in accordance with the spirit of this invention to produce the initial foaming to form a slight frosty appearance on the inner walls of the cups. The outer surfaces and the upper rims of the cups were hard, smooth and had the characteristic transparency of polystyrene. A frosty appearance existed as a result of the slight foaming of the interiors. When the cups were subsequently used for drinking and contained hot coffee they were finally foamed by the heat of the contents. The additional wall thickness produced by the foaming supplied insulation qualities and strength to the container.

While in the foregoing specification this invention has been described in relation to preferred embodiments thereof, and many details have been set forth for the purpose of illustration, it will be apparent to those skilled in the art that the invention is susceptible to other embodiments and that many of the details set forth herein can be varied considerably without departing from the basic principles of the invention.

What is claimed is:

1. A method for producing a partially foamed, foamable thermoplastic container comprising the steps of:

(1) in the presence of a foaming agent, and under pressure sufficient to prevent foaming agent activity, injection molding a thermoplastic material to produce a foamable thermoplastic container;

(2) placing the foamable thermoplastic container in an apparatus including means for heating certain selected surfaces of the foamable thermoplastic container and means for cooling other selected surfaces of the container;

(3) spacing the selected surfaces to be heated from the heating means so that upon heating said surfaces are allowed to become just frosty in appearance;

(4) heating the selected surfaces of the foamable thermoplastic container for a period of time and at a temperature sufficient to commence foaming activity; to produce a partially foamed, foamable thermoplastic container; whereby, upon further heating, the partially foamed thermoplastic container formed has superior strength and does not lose its shape.

2. The method of claim 1 wherein the internal surfaces of the container are the selected surfaces of steps (2) and (3).

3. A method for producing a partially foamed, foamable thermoplastic container comprising the steps of:

(1) placing a foamable thermoplastic container having sidewalls of a definite thickness in an apparatus having means for heating the interior surfaces of such container sidewalls and cooling the exterior surfaces thereof;

(2) spacing the interior surfaces of the container sidewalls from the heating means so that upon heating, the container sidewalls are allowed to increase in thickness only an insignificant amount;

(3) heating the container sidewalls for a period of time and at a temperature sufficient to commence foaming activity, to produce a partially foamed, foamable thermoplastic container; whereby upon further heating the partially foamed thermoplastic container formed has superior strength and does not lose its shape.

References Cited

UNITED STATES PATENTS

| | | | |
|---|---|---|---|
| 2,954,589 | 10/1960 | Brown | 264—51 XR |
| 3,013,306 | 12/1961 | Richie et al. | 264—51 |
| 3,139,466 | 6/1964 | Couchman | 264—51 |
| 3,144,493 | 8/1964 | Santelli | 264—51 |
| 3,170,010 | 2/1965 | Schultz et al. | 264—51 |
| 3,203,611 | 8/1965 | Anderson et al. | |
| 3,225,126 | 12/1965 | Bridges et al. | 264—51 |
| 3,324,210 | 6/1967 | Aykanian | 264—45 |
| 3,389,197 | 6/1968 | Flynn et al. | 264—51 XR |
| 2,964,799 | 12/1960 | Roggi et al. | 264—47 |
| 3,042,972 | 7/1962 | Lafferty | 264—53 |
| 3,424,826 | 1/1969 | Aykanian et al. | 264—28 XR |

PHILIP E. ANDERSON, Primary Examiner

U.S. Cl. X.R.

18—5; 229—1.5; 264—51, 234, 237